(12) United States Patent
Nielsen et al.

(10) Patent No.: US 12,015,334 B2
(45) Date of Patent: Jun. 18, 2024

(54) POWER ELECTRONIC DEVICE

(71) Applicant: Danfoss Power Electronics A/S, Gråsten (DK)

(72) Inventors: Ansgar Nielsen, Aabenraa (DK); Henrik Rosendal Andersen, Graasten (DK); Steen Hornsleth, Sønderborg (DK)

(73) Assignee: DANFOSS POWER ELECTRONICS A/S, Gråsten (DK)

( * ) Notice: Subject to any disclaimer, the term of this patent is extended or adjusted under 35 U.S.C. 154(b) by 393 days.

(21) Appl. No.: 16/695,567

(22) Filed: Nov. 26, 2019

(65) Prior Publication Data

US 2020/0169163 A1    May 28, 2020

(30) Foreign Application Priority Data

Nov. 27, 2018 (DE) .......................... 102018129909.5

(51) Int. Cl.
*H02M 1/32* (2007.01)
*H02M 5/458* (2006.01)

(52) U.S. Cl.
CPC ........... *H02M 1/32* (2013.01); *H02M 5/4585* (2013.01); *H02M 1/327* (2021.05)

(58) Field of Classification Search
CPC ................................ H02M 1/322; H02M 1/32
See application file for complete search history.

(56) References Cited

U.S. PATENT DOCUMENTS

| | | | | |
|---|---|---|---|---|
| 4,331,994 A | * | 5/1982 | Wirth | H02H 3/445 361/56 |
| 6,072,291 A | * | 6/2000 | Pedersen | B60L 7/003 318/362 |
| 2002/0070821 A1 | | 6/2002 | Moller | |
| 2009/0079191 A1 | * | 3/2009 | Mari | H02P 9/14 290/43 |
| 2009/0109713 A1 | * | 4/2009 | Schnetzka | H02M 5/4585 363/34 |
| 2013/0169345 A1 | * | 7/2013 | Bauer | H03K 17/00 327/419 |
| 2015/0155794 A1 | * | 6/2015 | Long | H02H 7/16 363/53 |
| 2017/0179811 A1 | * | 6/2017 | Knudsen | H02M 7/04 |
| 2018/0062557 A1 | * | 3/2018 | Tao | H02M 1/00 |

FOREIGN PATENT DOCUMENTS

| | | |
|---|---|---|
| CN | 101540556 A | 9/2009 |
| CN | 104734528 A | 6/2015 |
| GB | 2512632 A | 10/2014 |

* cited by examiner

*Primary Examiner* — Thienvu V Tran
*Assistant Examiner* — Peter M Novak
(74) *Attorney, Agent, or Firm* — McCormick, Paulding & Huber PLLC

(57) ABSTRACT

A power electronic device includes an input which is connected to an over-current-protection device arrangement and a DC-link, wherein the DC-link includes a series connection of at least two DC-link capacitors. In such a power electronic device the risk of a fire hazard should be minimized. To this end fault detecting element(s) are provided detecting an imbalance between the DC-link capacitors or an overload of at least one of the DC-link capacitors, wherein the fault detecting element(s) control maximum current inducing element(s) connected to the DC-link.

20 Claims, 2 Drawing Sheets

POWER ELECTRONIC DEVICE

CROSS-REFERENCE TO RELATED APPLICATION

This application claims foreign priority benefits under 35 U.S.C. § 119 to German Patent Application No. 102018129909.5 filed on Nov. 27, 2018, the content of which is hereby incorporated by reference in its entirety.

TECHNICAL FIELD

The present invention relates to a power electronic device comprising an input which is connected to an over-current-protection device arrangement and a DC-link, wherein the DC-link comprises a series connection of at least two DC-link capacitors.

BACKGROUND

The DC-link capacitors are in many cases electrolytic capacitors. When an electrolytic capacitor overloads, for example by an overvoltage, the capacitor risks severe damage possibly causing a fire hazard. This problem is important since the DC-link capacitor is usually in a cooling channel having openings for ambient air to enter. If the capacitor explodes, a flash or spark has a high probability of traveling down the cooling channel posing a fire hazard.

The input of the power electronic device can directly be connected to the DC-link when the input is supplied with DC current. Such a situation occurs, for example, when a plurality of power electronic devices are connected to a common rectifier stage.

Another possibility is that the input of the power electronic device is connected to a rectifier, particularly a passive rectifier.

A passive rectifier is formed of passive components only. This has the advantage that a passive rectifier can be produced with low costs. However, a passive rectifier cannot be used for minimizing the risk of a fire hazard.

SUMMARY

The object underlying the invention is to minimize the risk of a fire hazard related to a power electronic device.

This object is solved with a power electronic device as described at the outset in that fault detecting means are provided detecting an imbalance between the DC-link capacitors or an overload of at least one of the DC-link capacitors, wherein the fault detecting means control maximum current inducing means connected to the DC-link.

The risk of a damage or explosion of one of the DC-link capacitors comes in particular up when this capacitor is overloaded. An overload situation arises e. g. when the capacitors are not balanced. The most severe unbalance occur in case of component brake down of one of the capacitors. In practice this is one of the main reasons for needing a protection function. The fault detecting means e. g. are provided for detecting whether the load situations of the DC-link capacitors is equal within an allowed range. When the fault detecting means e. g. detect that one of the capacitors is overloaded, it controls the maximum current inducing means. The maximum current inducing means establish a situation on the DC-link in which a large current flows through the DC-link. This current is so large that the over-current-protection device arrangement reacts and interrupts a further supply of current from the grid to the input of the rectifier or from the DC-supply to the DC-link. Accordingly, no further current can flow into the DC-link and accordingly no further energy is supplied to the DC-link capacitor so that the risk of explosion of the overloaded DC-link capacitor is minimized.

In an embodiment of the invention the fault detecting means detect at least one parameter of at least one of the DC-link capacitors. This parameter can directly be detected or indirectly be detected. In the first case the parameter is directly taken from the respective capacitor. In the second case information from another part of the electronic device can be obtained indicating that, for example, a capacitor is overloaded. Such an indirect detection can be made, for example, by monitoring other components of the power electronic device, for example other voltage measurements, temperature measurements, currents measurements and the like from which an overload situation of a DC-link capacitor can be derived.

In an embodiment of the invention the fault detecting means compare at least a parameter of one of the capacitors with a parameter of another one of the capacitors. This is a simple way to detect an imbalance.

In an embodiment of the invention the parameter is a voltage over the capacitor, a current through the capacitor, or a temperature of the capacitor. When for example one capacitor is shorted, the full voltage of the DC-link is applied to the remaining capacitor or capacitors which leads to an overload situation of the respective capacitors. The same is true for a difference between the temperatures of the capacitors which exceeds an allowable level. In both cases the maximum current is induced or generated to operate the overcurrent protection device arrangement which are connected on the grid side of the passive rectifier when a passive rectifier is used or in another way connected to the DC-link.

In an embodiment of the invention an inverter is connected to the DC-link and the inverter at least partly form the maximum current inducing means. The inverter comprising a number of controlled switches. Accordingly, it can be controlled to close one or more of the controlled switches to increase a current drawn from the DC-link.

In an embodiment of the invention the fault detecting means control the inverter to feed excessive energy to inverter load. When the inverter load is supplied with excessive energy, the corresponding large current is drawn from the grid side, wherein this current exceeds the level allowed by the over-current-protection device.

In an embodiment of the invention the maximum current inducing means together with or without existing load establish a sufficient current flow to activate the overcurrent protection arrangement. This can be achieved, for example, in that the maximum current inducing means establish a low impedance connection, in particular a short-circuit downstream the passive rectifier. This low impedance connection or short circuit can be established, for example, by the inverter to shoot-through in one or more of the inverter phases. A shoot-through in an inverter phase can be made, for example, by turning on all its series-coupled switching elements simultaneously and hereby shorting the DC-link capacitor through the switching elements of the inverter. It is, however, also possible to use a separate switch short circuiting the DC-link. Such a short circuit can include an impedance in series and include a brake function.

In an embodiment the maximum current inducing means are mechanically encapsulated. It is therefore allowed that the maximum current inducing means are destroyed for damage when an imbalance situation occurs. However, they are mechanically encapsulated so that there is no fire hazard and no danger for the ambient.

In an embodiment of the invention the over-current-protection device arrangement comprises at least a fuse, an electronic device, a circuit breaker, or an intended weak spot or any other element in the design of the power electronic device that can interrupt the current flow without creating a fire hazard. The fuse can be a fast or a slow fuse. A fuse is a cheap and reliable element to interrupt the supply of current through the respective phase.

BRIEF DESCRIPTION OF THE DRAWINGS

Embodiments of the invention will now be described in more detail with reference to the drawing, wherein.

DETAILED DESCRIPTION

Figure 1:
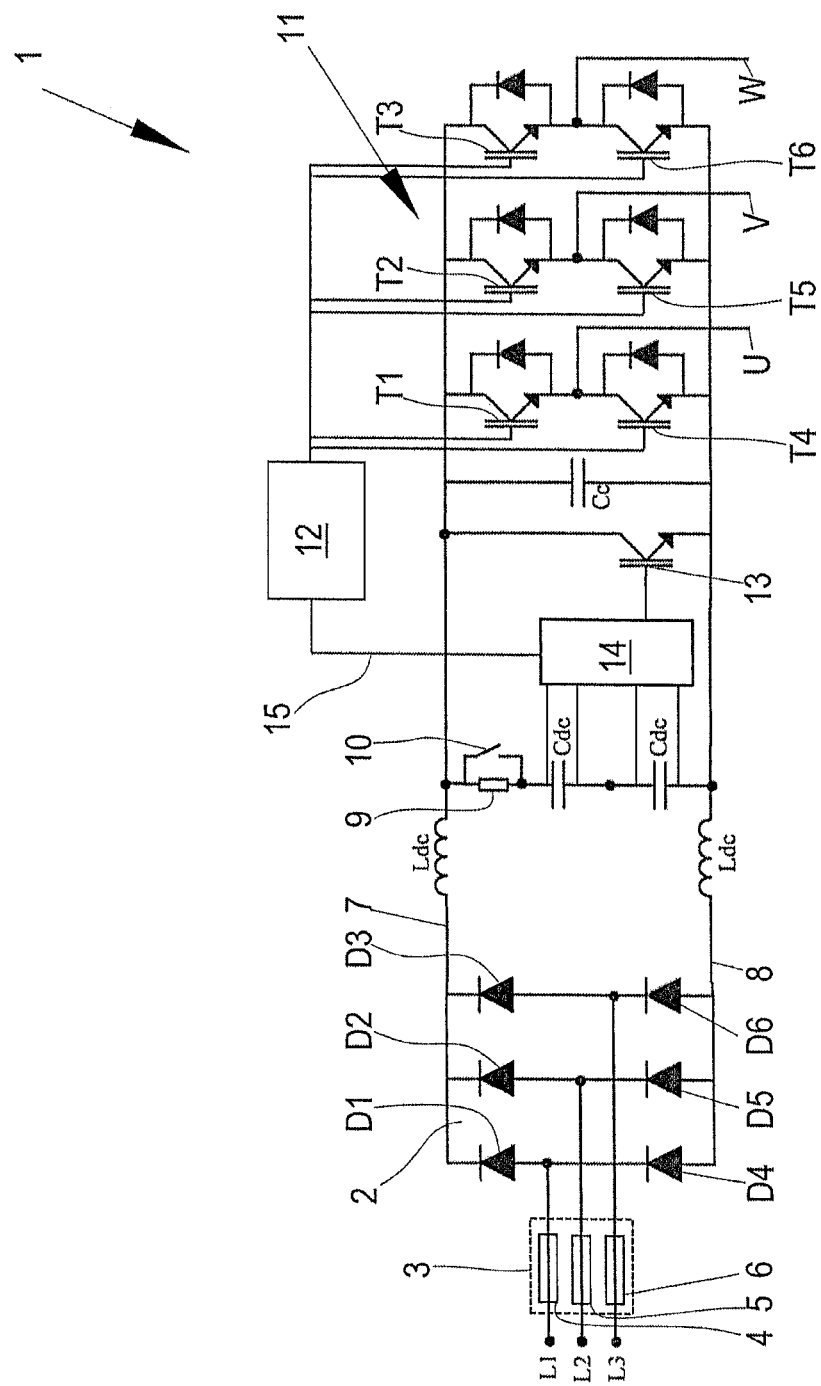
FIG. 1 shows a schematic circuit diagram of a power electronic device.

FIG. 1 shows a power electronic device in form of a frequency converter 1 comprising a passive rectifier 2, the input of which is connected to a grid L1, L2, L3 via an over-current-protection device arrangement 3 which comprises for each phase L1, L2, L3 a fuse 4, 5, 6, respectively.

The rectifier 2 is a passive rectifier comprising six diodes D1, D2, D3, D4, D5, D6. The output of the passive rectifier 2 is connected to a DC-link having a positive rail 7 and a negative rail 8. The DC-link comprises two inductances Ldc, one in the positive rail 7 and one in the negative rail 13. The inductances Ldc are optional.

Two or more DC-link capacitors Cdc are connected in series between the positive rail 7 and the negative rail 8. They can be connected in series with a resistor 9 which can be bridged by an inrush relay 10. Other inrush functions can be used. The arrangement of resistor 9 and inrush relay 10 is optional.

The DC-link with its rails 7, 8 is connected to an inverter stage 11 having a number of controlled switches T1, T2, T3, T4, T5, T6, for example in form of semiconductor switches, like IGBT or GTO. The input side of the inverter stage 11 is connected to a capacitance Cc. The arrangement of DC-link capacitor can be made up of combinations of more capacitors in parallel and in series.

The inverter stage 11 is controlled by control means 12. In a way known per se, the control means 12 operate the switches T1, T2, T3, T4, T5, T6 so that on output-phases U, V, W appear alternating voltages the phases of which are phase-shifted to each other.

A transistor 13 (or any other electronically switchable element) is connected between the positive link 7 and the negative link 8 as will be explained later.

Fault detecting means 14 are connected to each of the two DC-link capacitors to detect a voltage drop over each of the DC-link capacitors. In case the fault detecting means 14 detect that voltages over the respective DC-link capacitors have a difference exceeding an allowable level, the fault detecting means 14 send a corresponding signal to the control means 12, for example via line 15. In this situation inverter stage 11 is commanded to shoot-through in one or more inverter phases. A shoot-through in an inverter phase is made by turning on all its series-coupled switching elements T1, T2, T3, T4, T5, T6 simultaneously and hereby shorting the DC-link capacitors Cdc.

In some cases, it might be sufficient to short circuit only one pair of switches, for example T1 and T4, T2 and T5 or T3 and T6.

Such a shoot-through induces a maximum current on the positive and negative rails 7, 8 with a consequence that the over-current-protection device 3 is triggered and interrupt a connection between the grid L1, L2, L3 and the passive rectifier 2. Accordingly, the risk that the DC-link capacitors Cdc explode is minimized.

The over-current-protection device 3 can be in form of an arrangement of fast or slow fuses. It can be an electronic device or a circuit breaker. It can even be another element in the power electronic device which can interrupt the current flow without creating a hazard, in particular a fire hazard. Such an element can be, e. g. an intended weak spot.

Another possibility to establish a short circuit between the positive rail 7 and the negative rail 8 is that the fault detecting means 14 actuate the transistor (or more general: switch 13) so that this switch 13 generates a short circuit on the output side of the passive rectifier 2.

A further possibility of generating enough current to open the over-current-protection device arrangement 3 is to control the inverter stage 11 for feeding excessive energy to an inverter load which is connected to the inverter phases U, V, W.

The maximum current induces on the positive and negative rails 7, 8 has the consequence that a corresponding large current flows through the over-current-protection device arrangement 3 and to open this arrangement 3 in a fast and reliable manner so that the DC-link capacitors Cdc are cut off from a further energy supply and the risk that in case of an imbalance a DC-link capacitor is overloaded and explodes is minimized.

The inverter stage 11, in particular electronic switches T1-T6 are mechanically encapsulated. They can be accommodated in a metal housing or box. On the other hand, the DC-link capacitors Cdc are usually arranged in a cooling channel having openings for ambient air to enter. Should the DC-link capacitor Cdc explode, it is almost inevitable that a flash or spark leaves the power electronic device via the cooling channel posing a fire hazard. This risk is not given when, for example, one or more of the electronic switches T1-T6 are damaged or destroyed. They are allowed to explode since such an explosion cannot propagate to the ambient.

Instead of detecting the voltage drops over the DC-link capacitors Cdc it is also possible that the fault detecting means 14 detect the temperatures of the DC-link capacitor Cdc which can also be used as parameter for detecting an imbalance. An overloaded capacitor will usually have a higher temperature than an unloaded capacitor.

Further other alternatives for detecting imbalance or overload of DC-link capacitor can also be used, e. g. current measurements directly or indirectly indicating overload of one or more of the DC-link capacitors.

The embodiment shown in FIG. 1 comprises a passive rectifier between a grid L1, L2, L3 as only way to supply DC-energy to the DC-link 7, 8. This is, however, not the only way to supply DC-power to the DC-link 7, 8.

Figure 2:
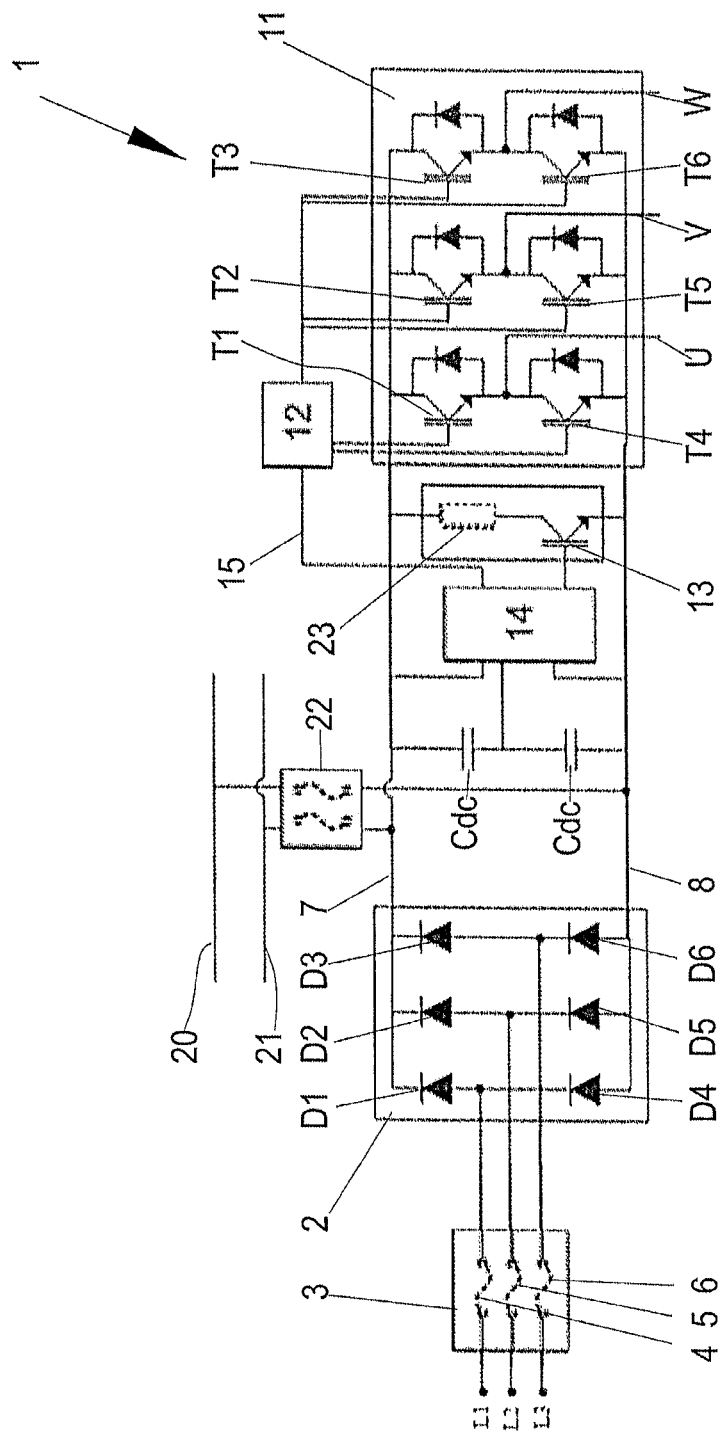
FIG. 2 shows a schematic circuit diagram of a second embodiment of a power electronic device.

FIG. 2 shows a second embodiment in which the DC-link 7, 8 is directly connected to a DC-supply 20, 21. An overcurrent protection device 22, is arranged between the DC-supply and the DC-link 7, 8.

The passive rectifier 2 is provided as well. However, this passive rectifier can be removed in such an embodiment.

The embodiment shown in FIG. 2 does not use chokes, like the two inductances Ldc of FIG. 1 to illustrate that these inductances are generally optional. Furthermore, a resistor 9 with the bridging inrush relay 10 are omitted to show that these components are optional as well.

The other components corresponds to the component shown in the embodiment of FIG. 1. The same elements are denoted with the same reference numerals.

It should be mentioned, that the means for establishing a short circuit between the positive rail 7 and the negative rail 8 can comprise an impedance 23 (shown in dotted lines) in series with the switch 13. This impedance 23 is, however, dimensioned such that a current flowing through the switch 13 is large enough to trigger the overcurrent protection device 3, 22.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A power electronic device comprising an input which is connected to an over-current-protection device arrangement and a DC-link, wherein the DC-link comprises a series connection of at least two DC-link capacitors, wherein fault detecting means are provided detecting an imbalance between the DC-link capacitors or an overload of at least one of the DC-link capacitors, wherein the fault detecting means control maximum current inducing means connected to the DC-link, wherein the over-current-protection device is configured to become activated after the fault detecting means controls the maximum current inducing means to induce a sufficient current flow in the power electronic device, wherein the over-current-protection device interrupts power flowing through the input when the over-current-protection device is activated, and wherein the input is configured such that during operation of the power electronic device, power flows through the input, when not interrupted, before flowing into the DC-link.

2. The power electronic device according to claim 1, wherein the fault detecting means detect at least one parameter of at least one of the DC-link capacitors.

3. The power electronic device according to claim 2, wherein the fault detecting means compare at least a parameter of one of the capacitors with a parameter of another one of the capacitors.

4. The power electronic device according to claim 3, wherein the parameter is a current through the capacitor or a temperature of the capacitor.

5. The power electronic device according to claim 4, wherein an inverter is connected to the DC-link and the inverter at least partly form the maximum current inducing means.

6. The power electronic device according to claim 3, wherein an inverter is connected to the DC-link and the inverter at least partly form the maximum current inducing means.

7. The power electronic device according to claim 3, wherein the parameter is a temperature of the capacitor.

8. The power electronic device according to claim 3, wherein the parameter is a voltage over the capacitor.

9. The power electronic device according to claim 3, wherein the maximum current inducing means together with or without existing load establishes the sufficient current flow to activate the overcurrent protection arrangement.

10. The power electronic device according to claim 2, wherein an inverter is connected to the DC-link and the inverter at least partly form the maximum current inducing means.

11. The power electronic device according to claim 2, wherein the maximum current inducing means together with or without existing load establishes the sufficient current flow to activate the overcurrent protection arrangement.

12. The power electronic device according to claim 1, wherein an inverter is connected to the DC-link and the inverter at least partly form the maximum current inducing means.

13. The power electronic device according to claim 12, wherein the fault detecting means control the inverter to feed excessive energy to inverter load.

14. The power electronic device according to claim 12, wherein the maximum current inducing means together with or without existing load establishes the sufficient current flow to activate the overcurrent protection arrangement.

15. The power electronic device according to claim 1, wherein the maximum current inducing means together with or without existing load establishes the sufficient current flow to activate the overcurrent protection arrangement.

16. The power electronic device according to claim 15, wherein the maximum current inducing means establish a low impedance connection.

17. The power electronic device according to claim 16, wherein the low impedance connection is a short circuit, downstream the passive rectifier.

18. The power electronic device according to claim 1, wherein in that the maximum current inducing means are mechanically encapsulated.

19. The power electronic device according to claim 1, wherein the over-current-protection device arrangement comprises a fuse, an electronic device, a circuit relay, or an intended weak spot.

20. The power electronic device according to claim 1, wherein the over-current-protection device arrangement comprises an electronic device.

* * * * *